Patented Mar. 24, 1953

2,632,698

UNITED STATES PATENT OFFICE 2,632,698

PLANT GROWTH REGULANT COMPOSITIONS CONTAINING HALOARYL SULFINIC AND THIOSULFINIC ACIDS OR THEIR SALTS

William D. Stewart, Brecksville, Ohio, assignor to The B. F. Goodrich Company, New York, N. Y., a corporation of New York No Drawing. Application April 6, 1950, Serial No. 154,441

9 Claims. (Cl. 71—2.6)

This invention relates to plant growth regulants and pertains particularly to compositions which alter or regulate the growth of plant cells by reason of their containing as an essential active ingredient a haloaryl sulfinic or thiosulfinic acid or a salt thereof, and to methods in which the growth characteristics of plants are modified by the application of such compounds.

I have discovered that haloaryl sulfinic and thiosulfinic acids and their salts have a marked effect on plant cell growth and that compositions containing such a compound as an active ingredient, together with an inert carrier, are useful in a variety of ways to regulate the growth characteristics of plants.

For example, they may be applied to seeds and tubers (which for the purpose of this invention are to be regarded as plants in the dormant stage) to stimulate germination and plant emergence or to inhibit sprouting or to stimulate development of roots; they may be applied to cuttings and transplants to stimulate root formation and root growth; they may be applied to fruit trees to reduce the number of set fruit or to delay or prevent premature drop of buds, leaves and fruit or to ornamental plants to delay fall of leaves and needles; they may be used for fortifying fertilizers and plant food to enhance growth and increase yield of various agricultural products; they may be used to produce modifications in leaf structures to enhance the productivity of a variety of plants; they may be used to induce parthenogenesis and thereby aid in the development of seedless berries and fruit and they may be employed in various other ways to produce useful histogenic and morphogenic changes in plants. In such applications compositions containing from about 0.001 to 1% by weight of the active ingredient are applied to at least some of the cells of the living plant structure, whether dormant or in an active state of development or growth, and the plant structure is thereafter maintained under conditions normally favoring development or growth. Compositions containing higher concentrations of the active ingredient, from about 1% to 10% by weight, so alter the growth characteristics of actively growing plants upon which they are applied as to cause the death of such plants; hence such compositions are useful as herbicides.

The haloaryl sulfinic acids and salts which are the active ingredients of the compositions of this invention can be illustrated by the following general formula:

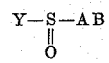

where Y is a haloaryl group, preferably having 6 to 10 carbon atoms and 2 to 10 halogen atoms, A is an atom of sulfur or oxygen and B is hydrogen or a cation of strong base. The preferred compounds of this class are the halobenzene sulfinic acids and their sodium and potassium salts and the halobenzene thiosulfinic acids and their sodium and potassium salts. It is also preferred that these halobenzene compounds have two halogen atoms on the benzene ring.

Among the specific compounds of the class illustrated by the general formula above there are for example such haloaryl sulfinic acids as p-bromobenzene sulfinic acid, p-iodobenzene sulfinic acid, p-fluorobenzene sulfinic acid, p-chlorobenzene sulfinic acid, 2,4-dibromobenzene sulfinic acid, 2,4-dichlorobenzene sulfinic acid, 2,4-difluorobenzene sulfinic acid, 2,4-diiodobenzene sulfinic acid, 2,5-dibromobenzene sulfinic acid, 2,5-dichlorobenzene sulfinic acid, 3,4-dibromobenzene sulfinic acid, 3,4-dichlorobenzene sulfinic acid, 2,4,6-tribromobenzene sulfinic acid, 2,4,6-trichlorobenzene sulfinic acid, mono-bromotoluene sulfinic acids, mono-chlorotoluene sulfinic acid, 2,4-dibromo-m-toluene sulfinic acid, 2,6-dibromo-m-toluene sulfinic acid, 2,4-dichloro-m-toluene sulfinic acid, 2,6-dichloro-m-toluene sulfinic acid, 3,4-dibromo-o-toluene sulfinic acid, 4,6-dibromo-o-toluene sulfinic acid, 3,4-dichloro-o-toluene sulfinic acid, 4,6-dichloro-o-toluene sulfinic acid, 2,3-dibromo-p-toluene sulfinic acid, 2,6-dibromo-p-toluene sulfinic acid, 2,3-dichloro-p-toluene sulfinic acid, 2,6-dichloro-p-toluene sulfinic acid, as well as the fluoro and iodotoluene sulfinic acids, 3-chloro-2,4-xylene sulfinic acid, 4-chloro-2,5-xylene sulfinic acid, 3-bromo-2,6-xylene sulfinic acid, 3-chloro-2,6-xylene sulfinic acid, 3-bromo-5-pseudocumene sulfinic acid, 3-chloro-5-pseudocumene sulfinic acid, and mono- and di-bromo-, mono- and di-chloro mesitylene sulfinic acid, and mono- and di-chloronaphthalene sulfinic acids.

These sulfinic acids are in general prepared by reacting a halogen-substituted aromatic hydrocarbon with chlorosulfonic acid in the presence of a reducing agent such as sodium sulfite or sodium sulfide. Thiosulfinic acids corresponding to the above-mentioned sulfinic acids are also within the above general formula and may likewise be used. They are prepared in a manner analagous to the sulfinic acids except that chlorothiosulfonic acid is used. Alkali metal salts of the sulfinic and thiosulfinic acids are also as effective in this invention as the free acids themselves.

Compositions containing such compounds useful for plant regulating purposes include solutions in organic solvents, aqueous compositions and dusts and can be readily and conveniently prepared as hereinafter described. Solutions in organic solvents containing any of the active ingredients hereinbefore named are prepared by dissolving a sufficient amount of the active ingredient in an appropriate organic solvent to give the desired concentration. Such solvents as the alcohols, acetone and liquid petroleum fractions are suitable. Where such solutions are to be used to stimulate plant cell growth as in root initiation, a non-phytotoxic solvent should be used.

Aqueous compositions can be prepared with or without a wetting or dispersing agent but the presence of such an agent is preferred. Two types of aqueous compositions containing a wetting or dispersing agent in addition to the active ingredient can be prepared. To prepare the one type, the active ingredient is first dissolved in a water-immiscible solvent such as kerosene and then the resulting solution is dispersed in an aqueous solution of a wetting or dispersing agent. The second type is prepared by dispersing the active ingredient in an aqueous solution of a wetting or dispersing agent.

Dusts can be prepared with or without a wetting or dispersing agent but the latter dust formulation (containing a surface active agent) is preferred. In preparing the dust formulations, the active ingredient is uniformly dispersed throughout the entire mass of a finely-divided pulverulent solid such as talc, diatomaceous earths, clays, or calcium carbonate by means of a ball mill, pebble mill or any other mechanical device. When a surface-active agent is used, it can be added to and mixed with the other ingredients.

Suitable dispersing or wetting agents which can be used to prepare the above-described compositions can be typified by the following general classifications: sodium and potassium salts of fatty acids known as soft and hard soaps; salts of disproportionated or hydrogenated abietic acid known as rosin soaps; salts of the hydroxyaldehyde acids present in seaweed known as algin soaps; alkali-casein compositions; water-soluble lignin sulfonate salts; long-chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having on the average of 16 carbon atoms in the alkyl group; water-soluble aryl sulfonates; water-soluble alkyl aryl sulfonates; water-soluble aralkyl sulfonates; water-soluble sorbitan monolaurate, -palmitate, -stearate, and -oleate; quaternary ammonium alkyl halides; fatty acids saponified with amines and amino alcohols; blood albumen; and others. These materials are sold under numerous trade names either as pure compounds or mixtures of compounds of the same class or mixtures of these compounds with fillers or diluents.

When the above dispersing or wetting agents are employed to prepare the plant growth regulating compositions containing haloaromatic sulfinic acids, haloaromatic thiosulfinic acids and salts of these acids as active ingredients, it is generally desirable to use only from 0.01% to about 1% by weight of the wetting or dispersing agent, depending on the efficiency of the specific dispersing or wetting agent.

The following specific examples illustrate the compositions of this invention and their utility.

*Example I*

Young potted tomato plants were immersed for 30 seconds in an aqueous dispersion containing 0.1% by weight of 2,5-dichlorobenzene sulfinic acid in an aqueous solution of 0.1% by weight of blood albumen. Within 24 hours after treatment there was produced severe epinasty in all the tomato plants treated with the aqueous dispersion but there were no signs of phytotoxicity. An aqueous dispersion containing 0.25% of 2,5-dichlorobenzene sulfinic acid and 0.1% by weight of blood albumen produced a strong nastic response in the tomato plants but also caused injury to the treated plants.

*Example II*

Young potted tomato plants were dipped for 30 seconds in an aqueous dispersion containing 0.05% by weight of sodium 2,5-dichlorobenzene sulfinate and 0.1% by weight of blood albumen as the dispersing agent. Within 24 hours after this treatment there was a marked nastic curvature in the tomato plants.

*Example III*

Young potted tomato plants were fed an aqueous dispersion containing 0.025% by weight of sodium 2,5-dichlorobenzene sulfinate and 0.1% of blood albumen as the dispersing agent. The feeding was accomplished by injecting the aqueous composition into the soil in the pots. Within 24 hours of the first feeding it was noted that there was a marked nastic response in the tomato plants so fed.

The above Examples I to III are concerned with laboratory tests showing that compositions containing the active agents of this invention are capable of stimulating cell proliferation in growing plants. Compositions which possess this property are recognized by those skilled in the art as being plant growth regulators and as being useful practically for the various applications disclosed hereinabove.

The following Examples IV to VII illustrate some of these practical applications.

*Example IV*

Bean seeds and tomato seeds were soaked overnight in an aqueous dispersion containing 100 p. p. m. (0.01% by weight) of 2,5-dichlorobenzene sulfinic acid and 0.1% by weight of blood albumen as the dispersing agent. These treated seeds were planted in flats in a greenhouse. Untreated seeds were also planted at the same time as a control. The treated seeds had germinated and emerged in 10 days after planting while the untreated seeds germinated and emerged 15 days after planting.

*Example V*

Young potted bean plants were dipped for 30 seconds in an aqueous medium containing 1000 p. p. m. (0.1% by weight) of 3,4-dichlorobenzene sulfinic acid dispersed in the aqueous medium by 0.1% by weight of blood albumen. Two weeks after this treatment it was noted that there was a marked morphogenic response in the plant as evidenced by the sending forth from the growing plant of fused or partially fused leaves instead of the normal, separated, trifoliated leaves. Bean plants with the former type of leaves have been found to produce a higher yield of beans than the plants with normal leaves.

*Example VI*

Terminal cuttings of Chrysanthemum about six inches long were treated with various aqueous media in an attempt to stimulate rooting. Twenty cuttings were dipped in an aqueous medium containing 0.025% by weight of 2,5-dichlorobenzene sulfinic acid and 0.1% by weight of blood albumen, twenty cuttings were dipped in an aqueous medium containing 0.025% by weight of 3,4-dichlorobenzene sulfinic acid and 0.1% by weight of blood albumen, twenty cuttings were dipped in an aqueous medium containing 0.025% by weight of sodium 2,5-dichlorobenzene sulfinate, and 0.1% by weight of blood albumen and twenty cuttings were dipped in an aqueous medium containing 0.1% blood albumen. These cuttings were planted in marked beds of moist sand in a greenhouse and were watered daily beginning 24 hours after planting. Twelve days after planting all the cuttings were removed and examined for rooth growth stimulation. All sixty of the cuttings treated with the compositions of this invention had numerous uniform heavy root growth while the cuttings treated with the water containing blood albumen had only a few sparse roots.

*Example VII*

Three apple trees, var. Courtland, bearing mature fruit were each sprayed with 30 gallons of an equeous composition containing 0.025% by weight of sodium 2,5-dichlorobenzene sulfinate and 0.1% by weight of blood albumen as the dispersing agent. Three different apple trees of the same variety were sprayed with an aqueous composition containing 0.0011% by weight (the recommended concentration) of napthalene acetic acid (a known plant regulant used herein for purpose of comparison) and 0.1% of blood albumen at the rate of 30 gallons of spray per tree. Forty-eight hours after spraying all fruit was removed from under the six trees. The apples dropped in the next four days, the third, fourth, fifth, and sixth day after spraying, were counted and recorded for each of the groups. In this four-day period only a total of 78 apples were dropped by the three trees sprayed with the sodium sulfinate composition. The three trees sprayed with the naphthalene acetic acid composition dropped a total of 220 apples or about three times as many apples as the three trees treated with the composition of this invention.

Other members of the class of active ingredients hereinbefore enumerated can be employed in the same manner as described in Examples I through VII. The other members of the preferred class of active ingredients, the halogenated benzene sulfinic and thiosulfinic acids and salts of these acids, will give substantially the same results as described in the above examples.

Although there has been disclosed specific examples of the compositions of this invention together with specific uses of these specific compositions, I do not desire or intend to limit myself solely thereto; for, as hitherto stated, there may be varied the precise proportions of the active ingredients as well as the precise materials employed as the carrier therefor, and the compositions may be used for various plant growth regulating purposes without departing from the spirit and scope of this invention as defined in the appended claims.

I claim:

1. The method of altering the growth characteristics of a plant which comprises applying to at least some of the cells of the plant structure, in a quantity sufficient to alter the growth characteristic of the plant, a composition containing as the essential active ingredient 0.01% to 10% by weight of a compound having the formula

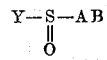

where Y is a haloaryl group, A is a member selected from the class consisting of oxygen and sulfur, and B is a member selected from the class consisting of hydrogen and a cation of a strong base.

2. The method of claim 1 wherein the compound of the recited formula is a dihalobenzene sulfinic acid.

3. The method of claim 2 wherein the dihalobenzene sulfinic acid is 2,5-dichlorobenzene sulfinic acid.

4. The method of claim 1 wherein the compound of the recited formula is a sodium salt of a dichlorobenzene sulfinic acid.

5. The method of claim 4 wherein the sodium salt is sodium 2,5-dichlorobenzene sulfinate.

6. A plant growth regulant composition comprising, as an essential active ingredient, 0.01% to 10% by weight of a compound having the formula

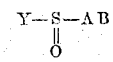

where Y is a haloaryl group, A is a member selected from the class consisting of oxygen and sulfur and B is a member selected from the class consisting of hydrogen and a cation of a strong base and also comprising from 0.01% to 1% by weight of a surface active agent, to promote contact of said active ingredient with the plant whose growth is being regulated.

7. A composition according to claim 6 further characterized in that the remainder of the composition is made up substantially of water.

8. A composition according to claim 7 further characterized in that the active ingredient of the recited formula is a dichlorobenzene sulfinic acid.

9. A composition according to claim 7 further characterized in that the active ingredient of the recited formula is sodium 2,5-dichlorobenzene sulfinate.

WILLIAM D. STEWART.

REFERENCES CITED

The following references are of record in the file of this patent:

FOREIGN PATENTS

| Number | Country | Date |
|---|---|---|
| 445,504 | Germany | July 21, 1923 |

OTHER REFERENCES

Beilstein's Handbuch der Organischen Chemie—Second Supplement to vol. XI; 4th edition (1950), page 5.